United States Patent
Ng et al.

(10) Patent No.: US 10,625,338 B2
(45) Date of Patent: Apr. 21, 2020

(54) METHOD FOR FORMING BRACE STRUCTURES FOR ADDITIVE MANUFACTURING

(71) Applicant: Applied Materials, Inc., Santa Clara, CA (US)

(72) Inventors: Hou T. Ng, Campbell, CA (US); Nag B. Patibandla, Pleasanton, CA (US); Ajey M. Joshi, San Jose, CA (US); Bharath Swaminathan, San Jose, CA (US); Ashavani Kumar, Sunnyvale, CA (US); Eric Ng, Mountain View, CA (US); Bernard Frey, Livermore, CA (US); Kasiraman Krishnan, Milpitas, CA (US)

(73) Assignee: Applied Materials, Inc., Santa Clara, CA (US)

( * ) Notice: Subject to any disclaimer, the term of this patent is extended or adjusted under 35 U.S.C. 154(b) by 931 days.

(21) Appl. No.: 15/211,960

(22) Filed: Jul. 15, 2016

(65) Prior Publication Data

US 2017/0014907 A1    Jan. 19, 2017

Related U.S. Application Data

(60) Provisional application No. 62/194,159, filed on Jul. 17, 2015, provisional application No. 62/361,203, filed on Jul. 12, 2016.

(51) Int. Cl.
| | |
|---|---|
| C04B 35/65 | (2006.01) |
| B22F 3/105 | (2006.01) |
| B29C 64/40 | (2017.01) |
| B29C 64/153 | (2017.01) |
| C04B 35/653 | (2006.01) |
| B33Y 10/00 | (2015.01) |
| B33Y 30/00 | (2015.01) |
| B29C 64/20 | (2017.01) |

(52) U.S. Cl.
CPC .......... *B22F 3/1055* (2013.01); *B29C 64/153* (2017.08); *B29C 64/40* (2017.08); *C04B 35/653* (2013.01); *B22F 2003/1056* (2013.01); *B22F 2003/1058* (2013.01); *B29C 64/20* (2017.08); *B33Y 10/00* (2014.12); *B33Y 30/00* (2014.12); *C04B 2235/6026* (2013.01); *Y02P 10/295* (2015.11)

(58) Field of Classification Search
CPC ...................................................... B29C 64/15
USPC .............................................................. 419/1
See application file for complete search history.

(56) References Cited

U.S. PATENT DOCUMENTS

| | | | |
|---|---|---|---|
| 5,503,785 | A | 4/1996 | Crump et al. |
| 5,658,412 | A | 8/1997 | Retallick et al. |
| 6,375,880 | B1 | 4/2002 | Cooper et al. |
| 7,685,694 | B2 | 3/2010 | Zagagi et al. |
| 8,173,059 | B2 | 5/2012 | Pham et al. |
| 8,845,319 | B2 | 9/2014 | Oberhofer et al. |
| 2015/0093283 | A1 | 4/2015 | Miller et al. |
| 2015/0151494 | A1 | 6/2015 | Eggers et al. |
| 2015/0174824 | A1 | 6/2015 | Gifford et al. |
| 2015/0367415 | A1 | 12/2015 | Buller |
| 2017/0036404 | A1 | 2/2017 | Rengers et al. |
| 2017/0072467 | A1 | 3/2017 | Zehavi et al. |

FOREIGN PATENT DOCUMENTS

| | | |
|---|---|---|
| CN | 104174846 | 12/2014 |
| JP | 2015-139957 | 8/2015 |
| WO | WO 01-28733 | 4/2001 |
| WO | WO 2014/124969 | 8/2014 |
| WO | WO 2015-038072 | 3/2015 |
| WO | WO 2015-108554 | 7/2015 |

OTHER PUBLICATIONS

International Search Report and Written Opinion in International Application No. PCT/US2016/052248, dated Dec. 21, 2016, 11 pages.
International Search report and Written Opinion in International Application No. PCT/US2016/042598, dated Feb. 14, 2017, 13 pages.
Office Action in Chinese Application No. 201680054187.0, dated Jul. 25, 2019, 14 pages (with English translation).

*Primary Examiner* — Edward M Johnson
(74) *Attorney, Agent, or Firm* — Fish & Richardson, P.C.

(57) ABSTRACT

Additive manufacturing of an object includes dispensing a plurality of successive layers of powder over a top surface of a platform, fusing an object region in each of the plurality of successive layers to form the object, and fusing a brace region in a particular layer from the plurality of layers to form a brace structure to inhibit lateral motion of the powder. The brace structure is spaced apart from the particular object region by a gap of unfused powder.

14 Claims, 8 Drawing Sheets

METHOD FOR FORMING BRACE STRUCTURES FOR ADDITIVE MANUFACTURING

CROSS-REFERENCE TO RELATED APPLICATIONS

This application claims priority to U.S. Provisional Application Ser. No. 62/194,159, filed on Jul. 17, 2015, and to U.S. Provisional Application Ser. No. 62/361,203, filed on Jul. 12, 2016, the entirety of which are incorporated by reference.

TECHNICAL FIELD

This specification relates to additive manufacturing, also known as 3D printing.

BACKGROUND

Additive manufacturing (AM), also known as solid freeform fabrication or 3D printing, refers to a manufacturing process where three-dimensional objects are built up from successive dispensing of raw material (e.g., powders, liquids, suspensions, or molten solids) in two-dimensional layers. In contrast, traditional machining techniques involve subtractive processes in which objects are cut out from a stock material (e.g., a block of wood, plastic or metal).

A variety of additive processes can be used in additive manufacturing. Some methods melt or soften material to produce layers, e.g., selective laser melting (SLM) or direct metal laser sintering (DMLS), selective laser sintering (SLS), fused deposition modeling (FDM), while others cure liquid materials using different technologies, e.g., stereolithography (SLA). These processes can differ in the way layers are formed to create the finished objects and in the materials that are compatible for use in the processes.

Conventional systems use an energy source for sintering or melting a powdered material. Once all the selected locations on the first layer are sintered or melted and then re-solidified, a new layer of powdered material is deposited on top of the completed layer, and the process is repeated layer by layer until the desired object is produced.

SUMMARY

In one aspect, a method for forming an object includes dispensing a plurality of successive layers of powder over a top surface of a platform, fusing an object region in each of the plurality of successive layers to form the object, and fusing a brace region in a particular layer from the plurality of layers to form a brace structure to inhibit lateral motion of the powder. The brace region is spaced apart from the particular object region by a gap of unfused powder. The brace structure of the particular layer includes a plurality of strands extending toward an outer perimeter of the particular layer.

In another aspect, a method for forming an object includes dispensing a plurality of successive layers of powder over a top surface of a platform, the plurality of successive layers of powder comprising a first layer and a second layer, fusing an object region in each of the plurality of successive layers to form the object, and fusing a first brace region for the first layer to form a first brace structure. The brace region is spaced apart from the particular object region by a gap of unfused powder. The brace region of the first layer surrounds a first object region of the first layer.

In another aspect, a method for forming an object includes dispensing a plurality of successive layers of powder over a top surface of a platform, fusing an object region in each of the plurality of successive layers to form the object, and fusing a brace region of at least one layer to form a first brace structure. The brace region is spaced apart from the particular object region by a gap of unfused powder. The brace structure includes a brace member and a keyed portion along the brace member, the keyed portion having a thickness greater than a thickness of the brace member.

Implementations of any aspect may include one or more of the following features.

The brace region of the particular layer may at least partially surround, e.g., entirely surround, a particular object region of the particular layer.

The brace structure of the particular layer may include a plurality of strands extending toward an outer perimeter the particular layer. The brace region may extend from sufficiently near the particular object region to inhibit relative motion between the object and the unfused powder.

Fusing the brace region may include fusing the brace region to form a brace member of the brace structure and to form a keyed portion along the brace member, the keyed portion having a thickness greater than a thickness of the brace member. The particular layer may be an uppermost layer of the plurality of successive layers. After fusing the object region and fusing the brace region, the brace structure and the object may be removed from the platform. The brace structure may be removed from the object by controlling an end effector having a lock portion engageable with the keyed portion. Removing the brace structure from the object may include sliding the brace structure relative to the object.

Fusing the brace region may include fusing an object perimeter region for the particular layer to form a perimeter brace spaced apart from and surrounding a perimeter of the particular object region. An offset distance may be determined based on the perimeter of the particular object region. Fusing the object perimeter region may include fusing the object perimeter region such that the perimeter brace is offset from the perimeter of the particular object region by the offset distance. Determining the offset distance may include determining the offset distance based on a perimeter of the object region in each of the plurality of successive layers. Determining the offset distance may include determining the offset distance such that the perimeter of the object perimeter region, as projected on the top surface, contains at least one of the perimeter of the object region of each of the plurality of successive layers beneath the particular layer, as projected on the top surface, or the perimeter of the object region of each of the plurality of successive layers above the particular layer, as projected on the top surface. The offset distance may be between one and ten voxels.

Fusing the brace region for the particular layer may include fusing an object perimeter region to form a perimeter brace spaced apart from and surrounding a perimeter of the particular object region, and forming a plurality of strands extending from the perimeter brace toward the outer perimeter of the platform. Forming the plurality of strands may include fusing a mesh region of the particular layer. The plurality of strands may define a plurality of separated cells of unfused powder in the particular layer. The plurality of separated cells form a checkerboard pattern, a radial web pattern or a rectangular pattern.

The particular layer may be a first particular layer of the plurality of successive layers. A brace region may be fused in a second particular layer of the plurality of successive layers. The brace region of the second particular layer may at least partially surrounding a particular object region of the second particular layer by a gap of unfused powder. The brace region of the second particular layer may extend toward an outer perimeter of the second particular layer.

A bottommost layer of powder may be dispensed beneath the plurality of successive layers and the platform. Fusing the object region may include fusing the object region while the bottommost layer of powder is unfused powder. An outer perimeter of the brace region may be inwardly offset from the outer perimeter of the platform.

Fusing the second brace region may include fusing the second brace region in the second layer such that the brace structure comprises a vertical brace member extending vertically through the second layer, the vertical brace member connecting the second brace structure to the first brace structure. A brace region may be fused in each of the plurality of successive layers to form a brace structure in each of the plurality of successive layers. Fusing the brace region in each of the plurality of successive layers may include fusing the first brace region and fusing the second brace region. After fusing the object region in each of the plurality of successive layers and fusing the first brace region and the second brace region, the first brace structure may be removed from the object by moving first brace structure in a first direction relative to the object, and the second brace structure from the object may be removed by moving the second brace structure in a second direction relative to the object, the second direction being opposite the first direction. Before fusing the first brace region and the second region, a geometric overlap between a first portion of the object corresponding to the first object region and a second portion of the object corresponding to the second object region may be computed. The geometric overlap may be determined to be less than a threshold overlap. The threshold overlap may be a threshold percent overlap between 50% and 90%.

In another aspect, an additive manufacturing apparatus for forming a part includes a support, a dispenser to deliver a plurality of successive layer of powder on the support, an energy source to fuse selected portions of an outermost layer of powder, and a controller coupled to the energy source. The controller is configured to cause the energy source to fuse an object region in each of the plurality of successive layers to form the object, and fuse a brace region in a particular layer from the plurality of layers to form a brace structure to inhibit lateral motion of the powder. The brace region of the particular layer is spaced apart from the particular object region by a gap of unfused powder, and at least one of i) the brace region comprises a plurality of strands extending toward an outer perimeter of the particular layer, ii) the brace region surrounds an object region of the first layer, or iii) the brace structure includes a brace member and a keyed portion along the brace member, the keyed portion having a thickness greater than a thickness of the brace member.

Implementations may include one or more of the following features.

The controller may be configured to cause the energy source to fuse the brace structure of the particular layer to include a plurality of strands extending toward an outer perimeter of the of the particular layer. The controller may be configured to cause the energy source to fuse the brace region to form a brace member of the brace structure and to form a keyed portion along the brace member. The keyed portion may hayed a thickness greater than a thickness of the brace member. The particular layer may be an uppermost layer of the plurality of successive layers.

The controller may be configured to control the energy source to fuse an object perimeter region for the particular layer to form a perimeter brace spaced apart from and surrounding a perimeter of the particular object region. The controller is configured to determine an offset distance based on the perimeter of the particular object region, and to cause the energy source to fuse the object perimeter region such that the perimeter brace is offset from the perimeter of the particular object region by the offset distance. The controller may be configured to determine the offset distance based on the perimeter of the particular object region by determining the offset distance based on a perimeter of the object region in each of the plurality of successive layers. The controller is configured to determine at least one of the perimeter of the object region of each of the plurality of successive layers beneath the particular layer, as projected on the top surface, or the perimeter of the object region of each of the plurality of successive layers above the particular layer, as projected on the top surface. The offset distance is between one and ten voxels.

The controller may be configured to cause the energy source to fuse an object perimeter region to form a perimeter brace spaced apart from and surrounding a perimeter of the particular object region, and form a plurality of strands extending from the perimeter brace toward the outer perimeter of the platform. The plurality of strands may form a mesh region of the particular layer. The plurality of strands may define a plurality of separated cells of unfused powder in the particular layer. The plurality of separated cells form a checkerboard pattern, a radial web pattern, or a rectangular pattern.

Advantages of the foregoing may include, but are not limited to, the following. The brace structures can inhibit relative movement between the object and unfused powder, enabling greater achievable resolutions for the object. The brace structures can also reduce manufacturing defects that may occur during a build process due to shifting of the unfused powder during, for example, movement of the build platform. The brace structures, by being separated from the build platform and the side walls extending from the build platform, do not fuse to the build platform and the side walls. In this regard, the process of building and removing the brace structures can result in a reduced amount of residual fused or semi-fused powder on the build platform or the side walls after the object and the brace structures are removed. In examples where the brace structures are built to be separated from the object by a gap, the process of removing the brace structures from the workpiece may result in fewer manufacturing defects. In particular, because the removal process does not necessitate an operation of breaking a connection between a supporting structure, e.g., the brace structure, and the workpiece.

The details of one or more implementations of the subject matter described in this specification are set forth in the accompanying drawings and the description below. Other potential features, aspects, and advantages will become apparent from the description, the drawings, and the claims.

BRIEF DESCRIPTION OF THE DRAWINGS

FIG. 6 is a side vertical cross-sectional view of an additive manufacturing apparatus having formed another example of an object and a brace structure formed by.

Like reference numbers and designations in the various drawings indicate like elements.

DETAILED DESCRIPTION

Additive manufacturing (AM) apparatuses can form an object by dispensing and fusing successive layers of a powder on a build platform. As the apparatus forms the object on the build platform, the powder and the object need to be supported on the build platform. Although the powder can be restrained by a side wall, the powder may shift during operation, resulting in distortion of the object being constructed. For example, this shifting might occur if the build platform is significantly larger than the object. However, a structure can be fabricated on the build platform to inhibit shifting between the object and the powder. For some or each of the layers, the apparatus fuses a portion of the powder that becomes a structure to support the object and the unfused powder. This structure, e.g., a brace structure, supports the object by inhibiting relative motion between the object and unfused powder within the successive layers dispensed on the build platform.

The brace structure, in some implementations, supports the object without being fused to the object, without being fused to the build platform, and/or without being fused to side walls extending vertically from the build platform. In this regard, in some examples, the brace structure is spaced apart from the object, the build platform, and/or the side walls. The brace structure extends through each layer or can extend through a subset of the successive layers dispensed. The brace structure extends from near the object outwardly toward a perimeter of the build platform and/or a perimeter of the layer of the powder. The brace structure, for example, includes a perimeter brace surrounding the object. Several strands extend horizontally above the build platform from the perimeter brace toward an outer perimeter of the build platform. In some cases, strands extending horizontally are connected by strands extending vertically above the build platform. Near an outer perimeter of the build platform, the brace structure includes an outer perimeter brace that is spaced apart from the outer perimeter of the build platform so that the brace structure does not contact the side walls. Optionally, the brace structure forms a cell or mesh structure extending from near the object to the perimeter of the build platform. For example, the strands may be cross-linked to form a mesh pattern.

Additive Manufacturing Apparatuses

Figure 1A:
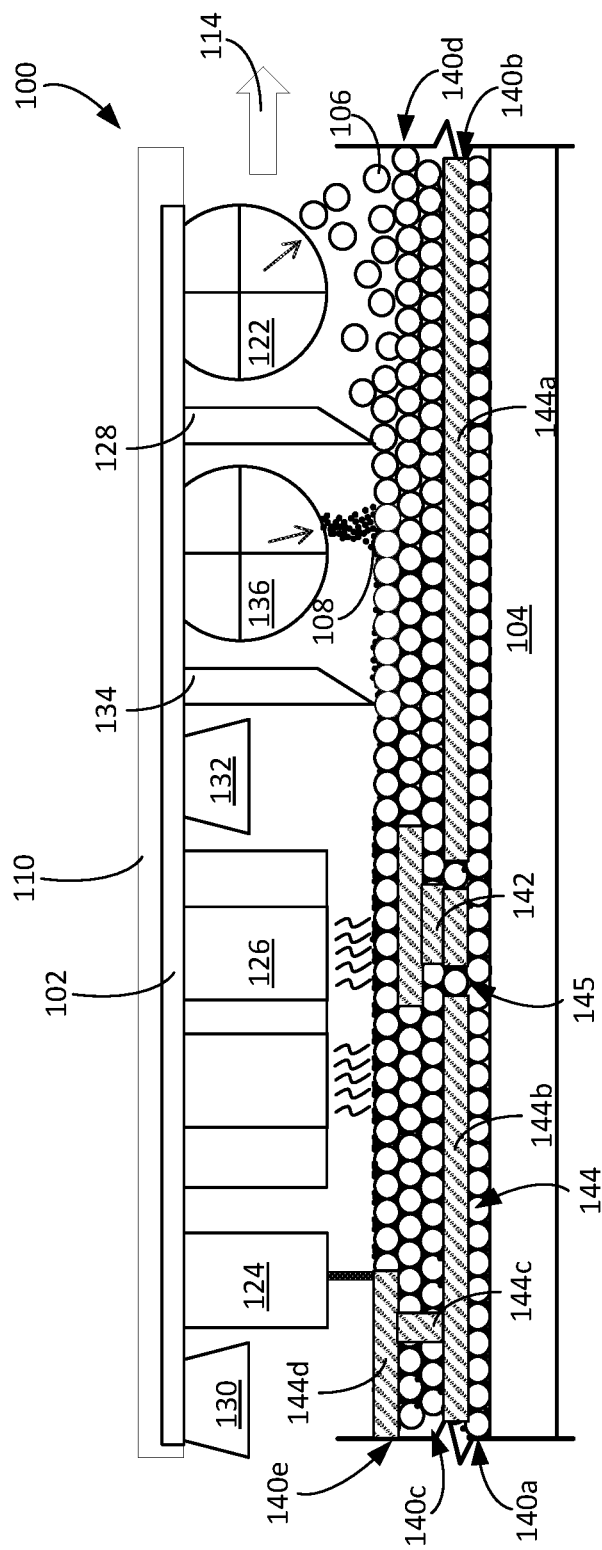
FIG. 1A is a schematic side view of an example of an additive manufacturing apparatus.
Figure 1B:
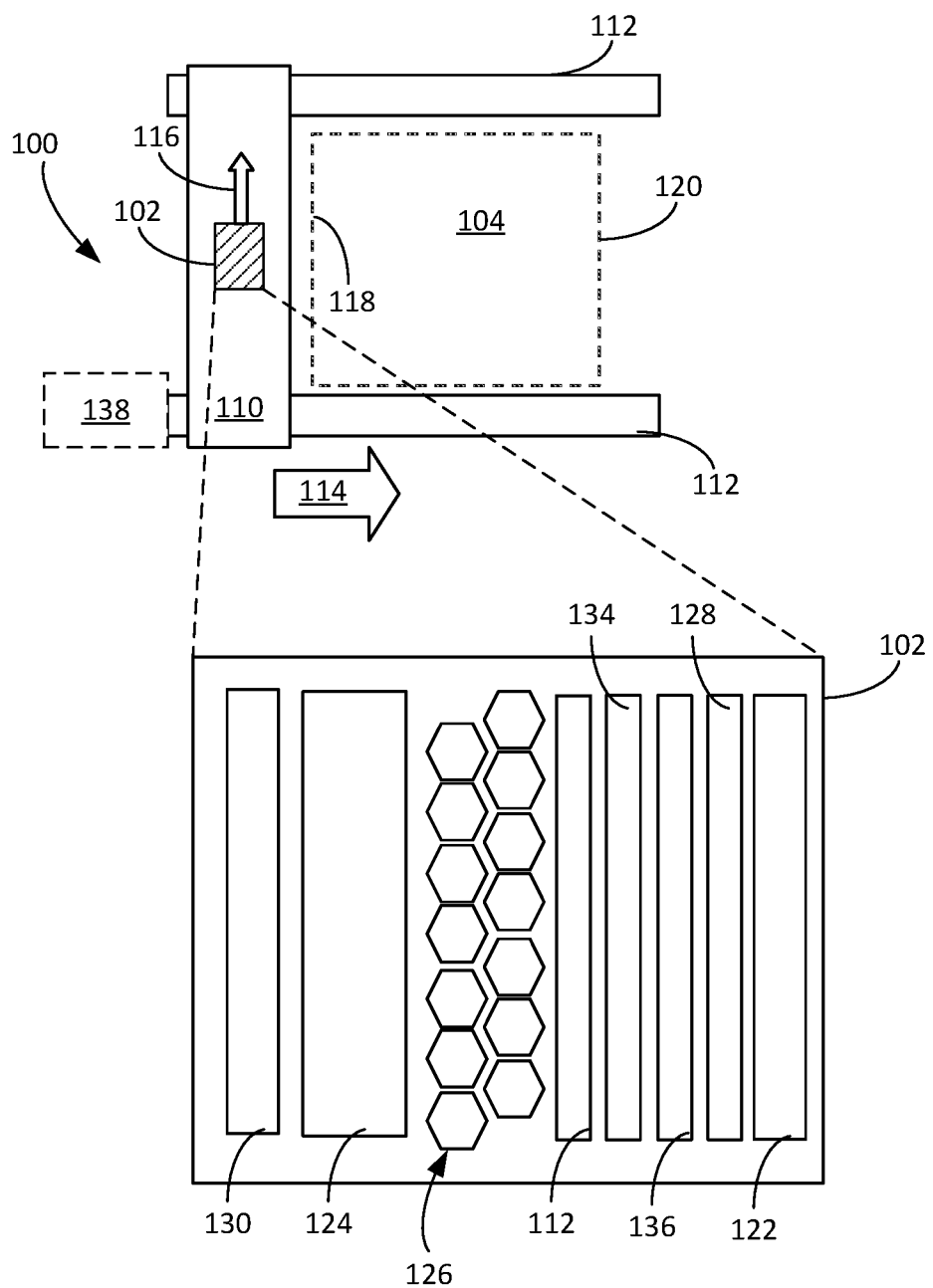
FIG. 1B is a schematic top view of the additive manufacturing apparatus of FIG. 1A.

FIGS. 1A and 1B show a schematic side view and top view, respectively, of an example additive manufacturing (AM) apparatus 100 that executes additive manufacturing operations to form an object and a brace structure to support the object. The apparatus 100 includes a build platform 104, a first dispensing system 122 to deliver layers of powder to the build platform 104, and an energy source 124 to fuse selected regions of the powder on the build platform 104.

Optionally, the first dispensing system 122 and/or the energy source 124 can be incorporated into a printhead 102 that is movable, e.g., vertically and/or horizontally, relative to the build platform 104. For example, referring to FIGS. 1A and 1B, the printhead 102 is supported on a gantry 110 configured to traverse the build platform 104. The gantry 110 includes, in some cases, a horizontally extending support on which the printhead 102 is mounted. The gantry 110 can be driven along rails 112 by a linear actuator and/or motor so as to move across the build platform 104 along a first axis parallel to a forward direction 114.

Alternatively, the first dispensing system 122 and/or the energy source 124 can be mounted on the build platform 104, or be mounted separately, e.g., on a frame supporting the build platform 104 or on chamber wall that surrounds the build platform 104.

The build platform 104 can be moved upward or downward during build operations. For example, the build platform 104 can be moved downward with each layer dispensed by the first dispensing system 122 so that the dispensing system 122 and energy source 124 remain at the same vertical height relative to the outermost layer of powder.

The first dispensing system 124 can include a roller that is positioned above the platform and which has apertures through which the powder passes. Alternatively, the first dispensing system 124 can include a powder delivery bed positioned adjacent the build platform, and a powder pusher, e.g. a blade or a roller, that moves laterally to push powder particles from the powder delivery bed over the build platform. Alternatively, the first dispensing system can include a powder ejection system. For example, the first dispensing system can include one or more nozzles that eject the powder particle. Such a dispending system can deliver the powder particles in a carrier liquid, e.g. a high vapor pressure carrier, to form the layers of powder material. The carrier fluid can evaporate prior to the sintering step for the layer, e.g., prior to the second particles being dispensed. Alternatively, a dry dispensing mechanism, e.g., one or more nozzles assisted by ultrasonic agitation and pressurized inert gas, can be employed to dispense the powder.

In some implementations, the energy source 124 can include a scanning laser that generates a beam of focused energy that increases a temperature of a small area of the layer of the powder. The energy source 124 can fuse the powder by using, for example, a sintering process, a melting process, or other process to cause the powder to form a solid mass of material.

In some cases, the energy source 124 can include an ion beam or an electron beam.

The energy source 124 can be positioned on the printhead 102 such that, as the printhead 102 advances in the forward direction 114, the energy source 124 can cover lines of powder dispensed by the dispensing system 122. When the apparatus 100 includes multiple dispensing systems, the printhead 102 can also optionally include an energy source for each of the dispensing systems.

Optionally, the apparatus 100 includes a heat source 126 to direct heat to raise the temperature of the deposited powder. The heat source 126 can heat the deposited powder to a temperature that is below its sintering or melting temperature. The heat source 126 can be, for example, a heat lamp array. The lamp array can simultaneously heat the entire layer of the powder. The heat source 126 can be incorporated into the printhead 102, mounted on the build platform 104, or be mounted separately, e.g., on a frame supporting the build platform 104 or on chamber wall that surrounds the build platform 104. The heat source 126 can be located, relative to the forward moving direction 114 of the printhead 102, behind the first dispensing system 122. As the printhead 102 moves in the forward direction 114, the heat source 126 moves across the area where the first dispensing system 122 was previously located to provide heat to the powder 106 most recently dispensed by the first dispensing system 122.

In some implementations, the heat source 126 is a digitally addressable heat source in the form of an array of individually controllable light sources. The array includes, for example, vertical-cavity surface-emitting laser (VCSEL) chips, positioned above the build platform 104. The array of controllable light sources can be a linear array driven by an actuator of a drive system to scan across the build platform 104. In some cases, the array is a full two-dimensional array that selectively heats regions of the layer by activating a subset of the individually controllable light sources.

In some implementations, the build platform 104 may include a heater that can heat powder dispensed on the build platform 104. The heater can be an alternative to or in addition to the heat source 126 of the printhead 102.

Optionally, the apparatus 100 can also include a first spreader 128, e.g., a roller or blade, that cooperates with first the dispensing system 122 to compact and spread powder dispensed by the dispensing system 122. The spreader 128 can provide the layer with a substantially uniform thickness. In some cases, the first spreader 128 can press on the layer of powder to compact the powder. The spreader 128 can be supported by the printhead 102, or separately.

The apparatus 100 also, optionally, includes a first sensing system 130 and/or a second sensing system 132 to detect properties, e.g., temperature, density, and material, of the apparatus 100 as well as powder dispensed by the dispensing system 122.

In some implementations, the apparatus 100 includes a second dispensing system 136 to dispense the second powder 108. The second dispensing system 136 can use any of the dispensing techniques discussed above for the first dispensing system. A second spreader 134 can operate with the second dispensing system 136 to spread and compact the second powder 108. The apparatus 100 can also include a second heat source that, like the first heat source 126, directs heat to powder in large areas of the build platform 104. If the apparatus 100 includes multiple heat sources and multiple energy sources on the printhead 102, each of the energy sources can be located immediately ahead of one of the heat sources (for the usual direction of motion when dispensing powder).

If present, the second dispensing system 136 enables delivery a second type of powder 108 having properties that differ from those of the first powder 106. The first powder particles 106 can have a larger mean diameter than the second particle particles 108, e.g., by a factor of two or more. When the second powder particles 108 are dispensed on a layer of the first powder particles 106, the second powder particles 108 infiltrate the layer of first powder particles 106 to fill voids between the first powder particles 106. The second powder particles 108, being smaller than the first powder particles 106, can achieve a higher resolution.

Alternatively or in addition, if the apparatus 100 includes two types of powders, the first powder particles 106 can have a different sintering temperature than the second particle particles. For example, the first powder can have a lower sintering temperature than the second powder. In such implementations, the energy source 124 can be used to heat the entire layer of powder to a temperature such that the first particles fuse but the second powder does not fuse.

In some implementations, the controller 138 can control the first and second dispensing systems 122, 136 to selectively deliver the first and the second powder particles 106, 108 to different regions. In implementations when multiples types of powders are used, the first and second dispensing systems 122, 136 can deliver the first and the second powder particles 106, 108 each into selected areas, depending on the resolution requirement of the portion of the object to be formed or the portion of the brace structure to be formed.

Materials for the powder include metals, such as, for example, steel, aluminum, cobalt, chrome, and titanium, alloy mixtures, ceramics, composites, and green sand. In implementations with two different types of powders, in some cases, the first and second powder particles 106, 108 can be formed of different materials, while, in other cases, the first and second powder particles 106, 108 have the same material composition. In an example in which the apparatus 100 is operated to form a metal object and dispenses two types of powder, the first and second powder particles 106, 108 can have compositions that combine to form a metal alloy or intermetallic material.

A controller 138 can coordinate the operations of the energy source 124 and the first dispensing system 122. The controller 138 also coordinates the operations of, if present, the heat source 126, the spreaders 128, 134, the first and second sensing systems 130, 132, and the second dispensing system 136. The controller 138 can also receive signals from, for example, user input on a user interface of the apparatus or sensing signals from sensors of the apparatus 100.

The controller 138 can operate the first dispensing system 122 to control, for example, the thickness and the distribution of the powder 106 dispensed on the build platform 104. The thickness of each layer depends on, for example, the number of the powder particles 106 stacked through a height of the layer or the mean diameter of the powder particles 106. In some implementations, each layer of the powder particles 106 is a single particle thick. In some cases, each layer has a thickness resulting from stacking multiple powder particles 106 on top of each other.

To move the build platform 104 up and down during build operations, the controller 138 can operate a drive mechanism, e.g., a piston or linear actuator, connected to the build platform 104 to decrease a height of the build platform 104 so that the build platform 104 can be moved away from the printhead 102. Alternatively, the build platform 104 can be held in a fixed vertical position, and the gantry 110 can be raised after each layer is deposited.

The controller 138 can include a computer aided design (CAD) system that receives and/or generates CAD data. The CAD data is indicative of the object to be formed, and, as described herein, can be used to determine properties of the structures formed during additive manufacturing processes. Based on the CAD data, the controller 138 can generate instructions usable by each of the systems operable with the controller 138, for example, to dispense the powder 106, to fuse the powder 106, to move various systems of the apparatus 100, and to sense properties of the systems, powder, and/or the object.

The controller 138, for example, can transmit control signals to drive mechanisms that move various components of the apparatus. In some implementations, the drive mechanisms can cause translation and/or rotation of these different systems, including dispensers, rollers, support plates, energy sources, heat sources, sensing systems, sensors, dispenser assemblies, dispensers, and other components of the apparatus 100. Each of the drive mechanisms can include one or more actuators, linkages, and other mechanical or electromechanical parts to enable movement of the components of the apparatus.

The controller 138, in some cases, controls movement of the printhead 102 and can also control movements of individual systems of the printhead 102. For example, the controller 138 can cause the printhead 102 to move to a particular location along the gantry 110, and the controller 138 can transmit a separate control signal to drive a separate drive mechanism to move the energy source 124 of the printhead 102 along the printhead 102. The apparatus 100 can further include a drive mechanism that moves the gantry 110 along the build platform 104 so that the printhead 102 can be positioned above different areas of the build platform 104.

During build operations, the controller 138 controls the dispensing system 122 to dispense the powder 106. The controller 138 can operate the dispensing system 122 to dispense successive layers 140a-140e of the powder 106.

The controller 138 can also operate the energy source 124 and, if present, the heat source 126 to fuse portions of each of the successive layers 140a-140e of the powder 106 to form a workpiece 142 that becomes the object to be formed. The workpiece 142 formed by the energy source 124 extends through several layers, e.g., the layers 140b-140e.

Brace Structures

The controller 138 controls the energy source 124 to fuse the powder 106 to form a brace structure 144. The brace structure 144 extends through the unfused powder 106 surrounding the workpiece 142 and can function as structural support that limits relative movement and shifting between the workpiece 142 and the unfused powder 106 as subsequent layers are dispensed and fused on top of the layers 140a-140e. The brace structure 144 therefore is a fused structure that does not form the object to be built by the apparatus 100.

In some implementations, after the dispensing system 122 dispenses the first layer 140a, the controller 138 proceeds to control the dispensing system 122 to dispense the second layer 140b on top of the first layer 140a without fusing any of the powder 106 within the first layer 140a. The first layer 140a corresponds to the bottommost layer of the successive layers dispensed by the dispensing system 122 and thus is beneath the layers 140b-140e. The controller 138 controls the energy source 124 to fuse portions of the powder 106 within the layers 140b-140e—dispensed on top of the first layer 140a and the build platform 104—to form the workpiece 142. The controller 138 also controls the energy source 124 to fuse portions of the powder 106 in the layers 140a to 140e to form the brace structure 144. The first layer 140a of the unfused powder can inhibit adhesion between fused powder and the build platform 104.

The controller 138 can control the energy source 124 to fuse a portion of the powder 106 within a single layer to form horizontally extending strands of the brace structure 144. The energy source 124 fuses the powder 106 within, for example, the second layer 140b to form strands 144a, 144b that extend horizontally above the build platform 104 and through the second layer 140b.

In some examples, the strands 144a, 144b do not contact the workpiece 142. The strands 144a, 144b are separated from the portion of the workpiece 142 within the layer 140b by a gap 145. The gap 145 is, for example, filled with unfused powder 106. Optionally, the strands 144a, 144b do not contact side walls of the apparatus 100, e.g., side walls that extend upwardly from the build platform 104 to contain the powder 106 within a confined area above the build platform 104.

The strands 144a, 144b extend horizontally and therefore can be formed from powder 106 within a single layer, e.g., the layer 140b. In some cases, the horizontally extending strands 144a, 144b can be formed of powder 106 within two or more layers to form thicker strands.

In some examples, the controller 138 can control the energy source 124 to fuse horizontally extending strands in multiple layers. The energy source 124 fuses the powder 106 within, for example, the fifth layer 140e to form a strand 144c of the brace structure 144 that extends horizontally above the build platform 104 and through the fifth layer 140e.

FIG. 1A depicts the apparatus 100 during the fusing operation for the layer 140e. In this regard, the strand 144c is not necessarily completely formed. In some examples, similar to the strands 144a, 144b, the strand 144c is formed such that the strand 144c does not contact the workpiece 142, particular the portion of the workpiece 142 to be formed in the fifth layer 140e.

In some cases, the controllers 138 controls the energy source 124 to fuse the powder 106 within a portion through several layers. The energy source 124 fuses the powder 106 within, for example, the layers 140c-140d to form a vertically extending strand 144d, shown in FIG. 1A, of the brace structure 144 that connects the horizontally extending strands 144b and 144c. The vertically extending strand 144d can inhibit relative horizontal motion between the strands 144b and 144c.

Figure 2:
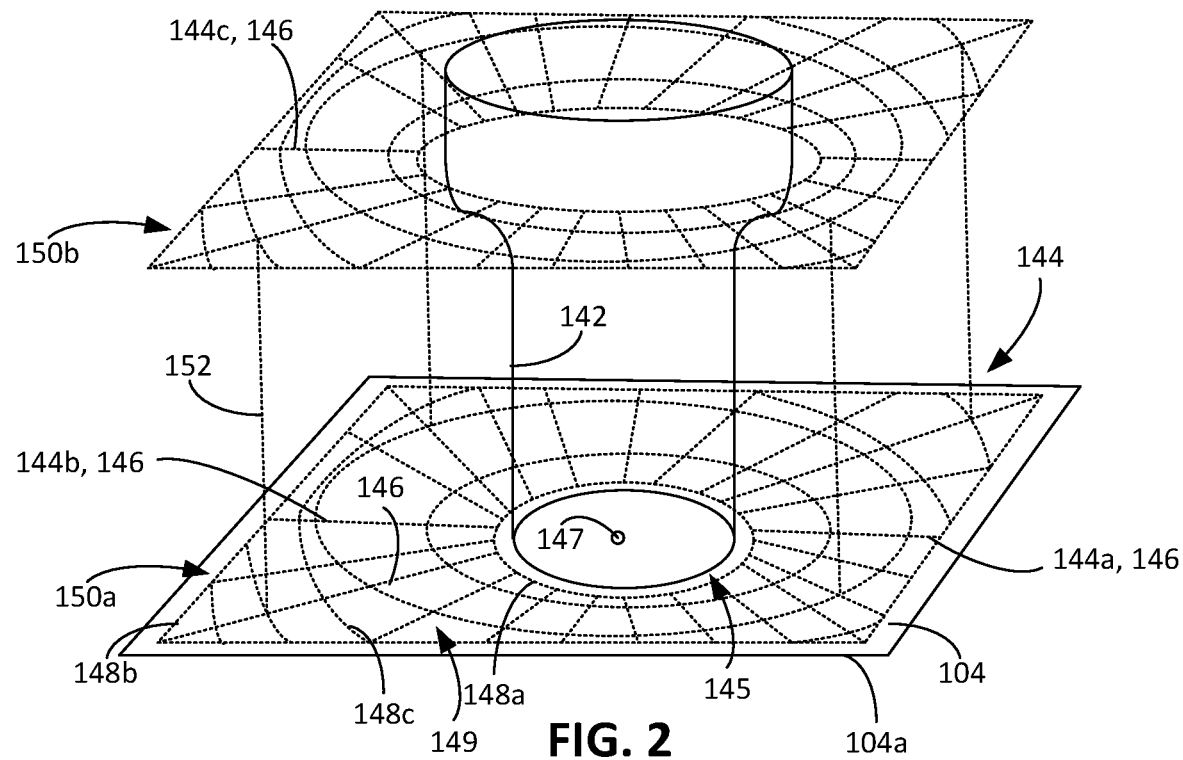
FIG. 2 is a schematic front perspective view of an object and a brace structure.

Each of the strands 144a, 144b, 144c, 144d shown in FIG. 1A and described above is described in greater detail with respect to FIG. 2, which shows the workpiece 142 supported by the brace structure 144 on top of the build platform 104. The strands 144a, 144b extend from near the workpiece 142 outwardly toward an outer perimeter 104a of the build platform 104. Within the layer forming the strands 144a, 144b, the brace structure 144 includes several strands 146—including the strands 144a, 144b—that radiate from the near the workpiece 142 toward the outer perimeter 104a of the build platform 104. In some implementations, the strands 146 extend radially relative to an area centroid 147 of a horizontal cross-section of the workpiece 142. Alternatively, the strands 146 extend outward from the workpiece 142 but do not extend radially relative to the area centroid.

The strands 146 can be connected by one or more connecting strands 148a, 148b, 148c (collectively referred to as connecting strands 148) that extend in a direction non-parallel to, e.g., perpendicular to, at an angle to, and/or away from, the strands 146. The connecting strands 148 inhibit relative motion between the strands 146. The connecting strands 148 also provide structural strength for the brace structure 144 to inhibit deflection of the strands 146.

Within the layer or layers of powder 106 where they are formed, the strands 146 and the strands 148 cooperate to define separated cells 149. The cells 149, during the build operations, contain unfused powder that separate adjacent strands 146 and that separate, if present, adjacent strands 148. As shown in FIG. 2, each of the cells 149 has edges that are defined by the strands 146 and edges that are defined by the strands 148. In implementations where the strands 146 extend radially outwardly relative to the workpiece 142 or relative to the area centroid of the cross-section of the workpiece 142 within the layers where the strands 146 are formed, the strands 146 and the strands 148 cooperate to form a radial web pattern of the cells 149.

The connecting strand 148 can include strands positioned near the workpiece 142. The strands can form a perimeter brace surrounding the workpiece 142 or adjacent to the workpiece 142. In some examples, the connecting strands 148 of the brace structure 144 include an inner perimeter strand 148a that surrounds the portion of the workpiece 142 in the layer that forms the strands 146. The inner perimeter strand 148a of the brace structure 144 is positioned near the workpiece 142 but is separated from the workpiece 142 by the gap 145. In some implementations, the inner perimeter strand 148a partially surrounds the workpiece 142.

The gap 145 between the inner perimeter strand 148a and the workpiece 142 is sized and dimensioned to inhibit relative motion between the workpiece 142 and the unfused powder. In some examples, the gap 145 has a size between 1 and 10 voxels, e.g., the dispensing system 122 can dispense 1 to 10 voxels of the powder 106 within the gap 145. In some implementations, the gap 145 is uniform has a uniform size around the workpiece 142 such that the gap 145 has a shape corresponding to an outermost perimeter of the workpiece 142.

In some implementations, this outermost perimeter can be the outer perimeter of the 2-D shape that occurs if the 3-D workpiece is projected onto the plane of the build platform 104, which can be computed by the controller 138. The inner perimeter strand 148a therefore can form a vertical wall that is uniformly spaced from the outermost perimeter of the workpiece 142 by an offset distance, where the offset distance is, for example, 1 to 10 voxels. The inner perimeter strand 148a can be a closed loop.

In some implementations, this outermost perimeter is the outer perimeter of the 3-D workpiece. In this case, the inner perimeter strand 148a is uniformly spaced from the outermost perimeter of the workpiece 142 by an offset distance, but mimics the curvature of the workpiece along the vertical axis.

The strands 146, extending away from near the workpiece 142, can terminate at an outer perimeter strand 148b positioned near the outer perimeter 104a of the build platform 104. The outer perimeter strand 148b can be formed to match the shape of the outer perimeter 104a of the build platform 104. In particular, the outer perimeter strand 148b can follow the outer perimeter 104a of the build platform 104 without crossing the outer perimeter 104a or without contacting, if present, the side walls of the build platform 104 that define the outer perimeter 148b of the build platform 104.

In some examples, the outer perimeter strand 148b is inwardly offset from the outer perimeter 104a of the build platform 104. The outer perimeter strand 148b can be inwardly offset by an offset distance. The offset distance can be between 1 and 10 voxels. Optionally, the outer perimeter strand 148b is a closed loop.

The inner perimeter strand 148a and the outer perimeter strand 148b, in combination with the unfused powder, support the workpiece 142 above the build platform 104 without direct contact between the brace structure 144 and the workpiece 142, the brace structure and build platform 104, and/or the brace structure 144 and the side walls. The absence of contact can reduce residual fused material on the workpiece 142, the build platform 104, and the side walls after the brace structure 144 is removed.

The brace structure 144 can additionally or alternatively include one or more interior connecting strands 148c positioned along the strands 146 between the starting point of the strands 146 near the workpiece 142 and the ending point of the strands 146 near the outer perimeter 104a of the build platform 104. The interior connecting strand 148c is positioned between, if present, the outer perimeter strand 148b and the inner perimeter strand 148a. Each of the interior connecting strands 148c can be closed loops.

FIG. 2 shows a first level 150a and a second level 150b of the brace structure 144. The first level 150a of the brace structure 144 includes the strands 146 and the strands 148 described herein. The second level 150b can include radiating strands, e.g., similar to the strands 146, and connecting strands, e.g., similar to the strands 148. FIG. 2 depicts, for example, a portion of the brace structure 144 of FIG. 1A including the horizontally extending strand 144c as well as the portion of workpiece 142 in the same layer as the horizontally extending strand 144c complete. The horizontally extending strand 144c, like the strands 144a, 144b, extend toward the outer perimeter 104a of the build platform 104.

The brace structure 144 can include several strands 152, including the strand 144d that extend vertically between the first level 150a and the second level 150b of the brace structure 144. In some examples, the strands 152 connect to the first level 150a where one of the strands 148 connects with one of the strands 146.

Figure 3A:
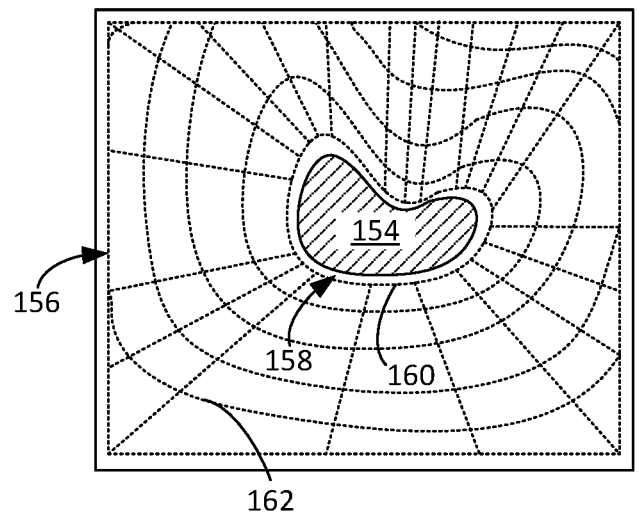
FIG. 3A is a top horizontal cross-sectional view of an additive manufacturing apparatus having formed an example of an object and a brace structure.

The geometry of the brace structure can vary depending on the geometry of the object to be formed. FIG. 3A shows a horizontal cross-section of a workpiece 154 having an amorphous geometry. A brace structure 156 supporting the workpiece 154 can have a geometry that matches the contours of the horizontal cross-section of the workpiece 154. In this regard, a gap 158 defined between an inner perimeter strand 160 of the brace structure 156 and the workpiece 154 can have a uniform offset such that the inner perimeter strand 160 has a similar geometry as the horizontal cross-section of the workpiece 154. Optionally, interior connecting strands 162 also have geometries similar to the geometry of the horizontal cross-section. For example, the interior connecting strands 162 has a shape having a perimeter that is a scaled representation of the perimeter of the horizontal cross-section of the workpiece 154.

Figure 3B:
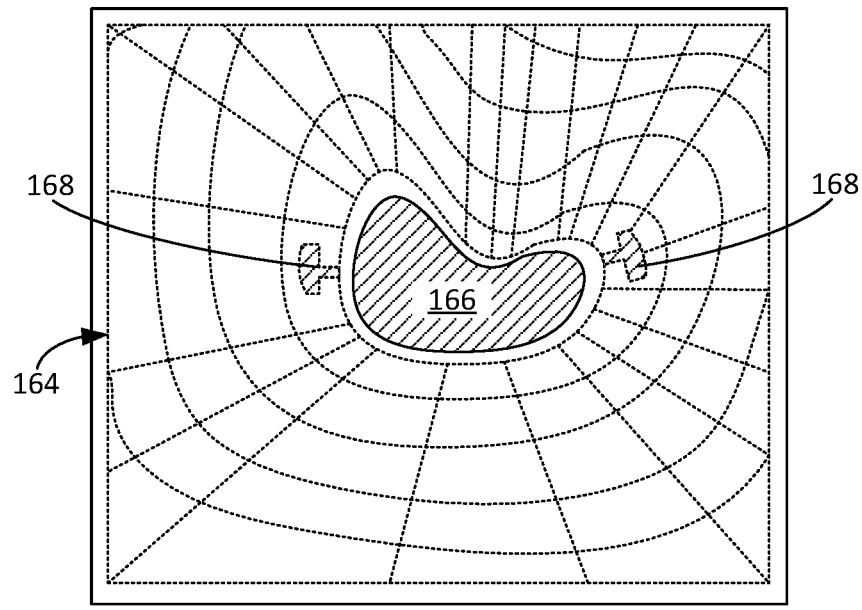
FIG. 3B is a top horizontal cross-sectional view of an additive manufacturing apparatus having formed another example of an object and a brace structure.

In some examples, to facilitate removal of a brace structure from the build platform of the apparatus, the brace structure includes enlarged fused portions. A robot arm controllable by the controller of the apparatus is able to grasp onto the enlarged fused portions of the brace structure and carry the brace structure from the build platform. As shown in FIG. 3B, depicting a horizontal cross-section of a brace structure 164 supporting a workpiece 166, the brace structure 164 includes keyed portions 168 along one or more of the horizontally extending strands forming the brace structure 164. The keyed portions 168 are positioned, for example, along an inner perimeter strand of the brace structure 164. In some implementations, the keyed portions 168 are positioned on interior connecting strands or on other horizontally extending strands. The keyed portions 168 additionally or alternatively are positioned along vertically extending strands.

The geometry of the keyed portions 168 enables the robot arm to easily grasp the brace structure 164. In some examples, the keyed portions 168 are solid fused structures with a greater thickness than the strands of the brace structure 164. In some examples, the keyed portions 168 are formed from several interconnected strands having a thickness equal to the thickness of the other strands of the brace structure 164. The strands of the keyed portions 168 are, for example, closely spaced to form a structure that the robot arm can grasp. These strands can form a truss structure with sufficient structural strength to support the weight of the brace structure 164 when the keyed portions 168 are grasped by the robot arm.

Optionally, to facilitate access by the robot arm of the apparatus, the keyed portions 168 are positioned on outer levels of the brace structure 164. For example, the keyed portions 168 can be positioned on an uppermost level of the brace structure 164 so that the robot arm can grasp the brace structure 164 from above the build platform 104. The keyed portions 168, alternatively or additionally, are formed along a lowermost level of the brace structure 164. If the keyed portions 168 are positioned on the lowermost level, the brace structure 164 can be removed from the build platform with the workpiece 166. The brace structure 164 can then be removed from a lower end of the workpiece 166.

For each level of the brace structure, the horizontally extending strands can be configured to form various geometries depending on the geometry of the workpiece. When the controller receives the CAD data for an object to be formed, the controller can determine configurations of the horizontally extending strands so that the brace structure provides greater support for the workpiece in some areas while providing less support in other areas. In particular, the portions of the object with geometries that may require greater resolution to achieve the geometry specified in the CAD data may benefit from greater support from the brace structure to achieve that greater resolution.

For example, if a portion of the object has a smaller radius of curvature, the controller can control the energy source such that the brace structure within the region surrounding that portion of the object has a greater density of strands, e.g., a greater number of strands per unit area. The brace structure can accordingly better inhibit movement of the surrounding unfused powder within that area. As a result, the energy source can achieve the higher resolution that may be necessary for the lower radius of curvature of the portion of the object.

Figure 3C:
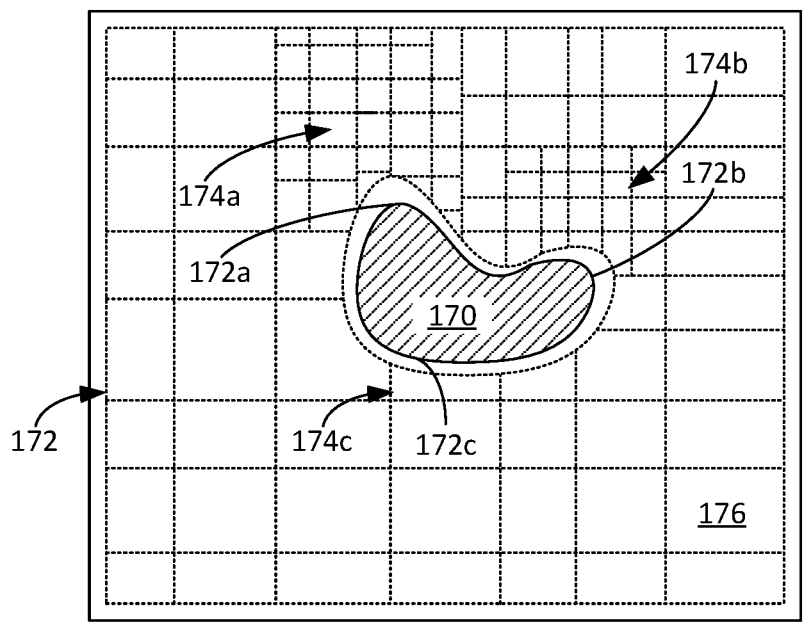
FIG. 3C is a top horizontal cross-sectional view of an additive manufacturing apparatus having formed yet another example of an object and a brace structure

In one example, as shown in FIG. 3C, a workpiece 170 having a horizontal cross-section with amorphous geometry is supported by a brace structure 172. The workpiece 170 includes a curved portions 172a, 172b, 172c. The curved portions 172a and 172b have radii of curvatures smaller than a radius of curvature of the curved portion 172c.

Because of the smaller radii of curvatures of the curved portions 172a, 172b, the brace structure 172 formed to support the workpiece 170 can include additional horizontally extending strands to form regions 174a and 174b of the brace structure 172 having greater density of horizontally extending strands. In contrast, the curved portion 172c with the higher radius of curvature is surrounded by a region 174c of the brace structure 172 that has a lower density of horizontally extending strands.

The greater density of the strands within the regions 174a, 174b increases the ability of the brace structure 172 in areas proximate the regions 174a, 174b to inhibit relative movement of the workpiece 170 and the unfused powder. By inhibiting this relative movement, the brace structure 172 enables fusing of the powder near the regions 174a, 174b to achieve greater resolutions in comparison to resolution achievable by fusing of the powder near the region 174c.

In the example as shown, the radius of curvature of the curved portion 172c is sufficiently large such that the region 174c with the lower density of strands is sufficient to achieve the resolution necessary for the larger radius of curvature. To reduce the amount of time to form the brace structure 172, particularly within the region 174c, the controller can reduce the density of the strands so that the brace structure 172 can be formed more quickly. In this regard, to determine the density of the strands within a region of the brace structure 172, the controller can consider several factors, for example, the required resolution for the workpiece near the region and the desired time to complete the object. The controller can select the density of the strands within the region such that each of the factors is fulfilled.

Furthermore, as shown in FIG. 3C, the brace structure 172 can form several cells 176 that form a checkerboard pattern, e.g., in contrast to the radial web pattern described and shown with respect to FIGS. 3A and 3B. The individual strands of the brace structure 172, for example, intersect such that they are substantially perpendicular (e.g., between 85 degrees and 95 degrees) relative to one another. Within the regions 174a, 174b, the checkerboard pattern of the brace structure 172 has a greater density of cells 176, e.g., there are a greater number of cells per unit area within the regions 174a, 174b. Within the region 174c, the checkerboard pattern of the brace structure 172 has a smaller density of cells 176, e.g., there are fewer cells per unit area within the region 174c.

In some implementations, each cell of the checkerboard pattern has substantially equal side lengths such that each cell is substantially square. In some examples, each cell is rectangular. While the radial web pattern and the checkboard pattern for a level of the brace structure have been described, in other examples, the pattern formed within a level of the brace structure can be other appropriate patterns, including a hexagonal pattern, a circular pattern, or combinations of the patterns described herein. The controller alternatively selects the pattern for a particular region of the brace structure depending on the geometry of the workpiece near that region.

Operations of the Additive Manufacturing Apparatus

The additive manufacturing apparatus, e.g., a controller of the apparatus, performs operations and processes to build the structures described herein to support the workpiece. Referring to FIG. 1A, 1B, the controller 138 can operate the apparatus 100, and in particular, the dispensing system 122 to control the dispensing operations. The controller 138 can receive signals from, for example, a user input on a user interface of the apparatus or sensing signals from sensors of the apparatus 100. The user input can CAD data indicative of the object to be formed. The controller 138 can use that CAD data to determine properties of the structures formed during additive manufacturing processes. Based on the CAD data, the controller 138 can generate instructions usable by each of the systems operable with the controller 138, for example, to dispense the powder, to fuse the powder, to move various systems of the apparatus 100, and to sense properties of the systems, powder, and/or the workpiece 142.

In an example process of forming an object, a controller (e.g., the controller 138) controls systems of an additive manufacturing apparatus to dispense (e.g., using the dispensing system 122) and to fuse (e.g., using the energy source 124) powder on a build platform (e.g., the build platform 104). FIGS. 4A to 4F depict sequential operations 400A to 400F in which the controller uses the additive manufacturing apparatus to perform these operations of forming the object. Before beginning the operations 400A to 400F, the controller of the apparatus can receive CAD data indicative of the object to be formed. As is described herein, using the CAD data, the controller can select properties of various structures formed during the operations 400A to 400F. For example, the controller can select a configuration of the brace structure to support the object to be formed.

Figure 4A:
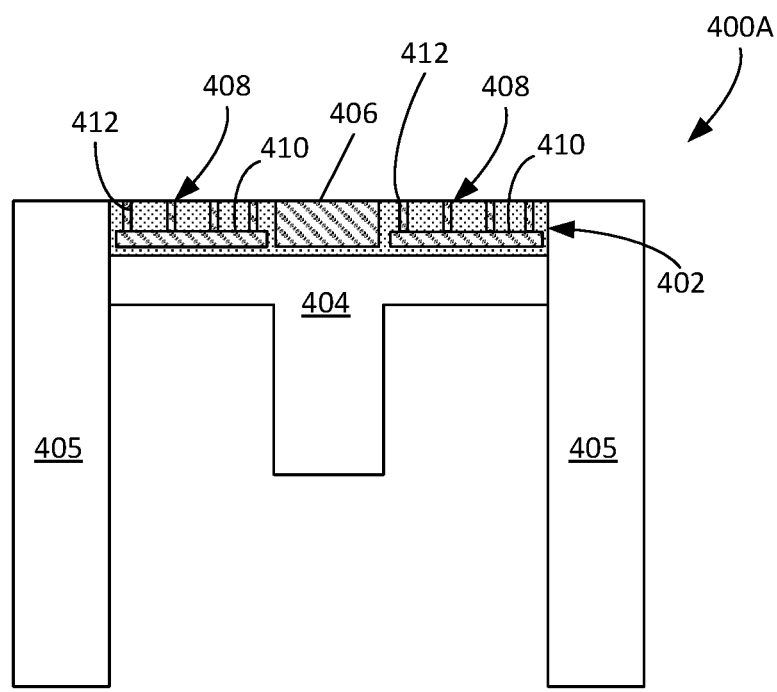
FIGS. 4A to 4F are each a side vertical cross-sectional view of an additive manufacturing apparatus performing an operation to form an object.

At operation 400A, as depicted in FIG. 4A, the controller controls the dispensing system of the apparatus to dispense a group of one or more layers 402 of powder particles on a build platform 404. The apparatus can be, for example, the apparatus 100 described with respect to FIG. 1A. The controller can be, for example, the controller 138 of the apparatus 100 described with respect to FIG. 1A. The build platform 404 can be the build platform 104 of the apparatus 100. When the apparatus dispenses the group of layers 402, the group of layers 402 can have a height that extends to a top surface of side walls 405 of the apparatus.

While the dispensing system dispenses the group of layers 402, for each layer within the group of layers 402, the controller determines whether to operate the energy source to fuse portions of the layer of the powder particles to form fused structures. Some of the fused structures form a workpiece 406 that forms part of the final object to be formed by the apparatus. In this regard, for each layer within the group of layers 402, the controller operates the energy source to fuse an object region such that the powder within that area fuses to form part of the workpiece 406. Because the geometry of the horizontal cross-section of the object can change from layer to layer, the object region can vary from layer to layer within the group of layers 402 to achieve these various geometries.

Some of the fused structures form a brace structure 408 that supports the workpiece 406 within the group of layers 402 of the powder particles. The brace structure 408 serves a similar function as, for example, the brace structures 144, 156, 164, 172 described herein. For each layer within the group of layers 402, the controller determines whether to operate the energy source to fuse a brace region such that the powder within that area fuses to form part of the brace structure 408.

The brace region can differ between the layers so that the brace structure 408 formed includes the various types of structural strands described with respect to the brace structures 144, 156, 164, 172. For example, as shown in FIG. 4A, the brace region within the layers forming a horizontal level 410 of the brace structure 408 differs from the brace region within the layers forming vertically extending portions 412.

To form the horizontal level 410, the brace region can include an object perimeter region that forms an inner perimeter brace spaced apart from and surrounding a perimeter of the object region within the layer or layers forming the horizontal level 410. The inner perimeter brace is similar to, for example, the inner perimeter strand 148a described with respect to FIG. 2. To form the inner perimeter brace, the controller optionally determines an offset distance based on a perimeter of the object region within the layer of powder forming the horizontal level. For example, the offset distance can be between 1 and 10 voxels.

In some implementations, the controller determines the offset distance between the inner perimeter brace and the perimeter of the object region within the layers forming the horizontal level based on the perimeter of object regions in layers outside of the layers forming the horizontal level 410. For example, the controller can select the offset distance such that the perimeter brace within the layers forming the horizontal level 410 encompasses a horizontal projection of the object within the layers forming the horizontal level 410. In this regard, the perimeter brace can encompass the perimeter of the object region for each of the successive layers dispensed or to be dispensed.

The brace region can also include regions to form the radially extending strands that radiate from near the workpiece 406, e.g., from the inner perimeter brace, toward the outer perimeter of the build platform 404. These radially extending strands correspond to, for example, the strands 146 of the brace structure 144.

In some implementations, the controller operates the energy source to fuse connecting strands, e.g., similar to the connecting strands 148a, 148b, 148c of the brace structure 144. The connecting strands and the radially extending strands together can form the horizontal level 410 of the brace structure 408, and thus form a mesh-like structure. The brace region fused by the energy source can therefore be a mesh region.

Alternatively or additionally, the controller controls the energy source to fuse some portions of the group of layers 402 to form vertically extending portions 412 of the brace structure 408. The vertically extending portions 412, if present, correspond to the vertically extending strands 144d described with respect to the brace structure 144.

Optionally, as described herein, one or more of the bottommost layers is left unfused so that neither the workpiece 406 nor the brace structure 408 contact the build platform 404. In some cases, the workpiece 406 contacts the build platform 404 while the brace structure 408 does not contact the build platform 404.

Figure 4B:
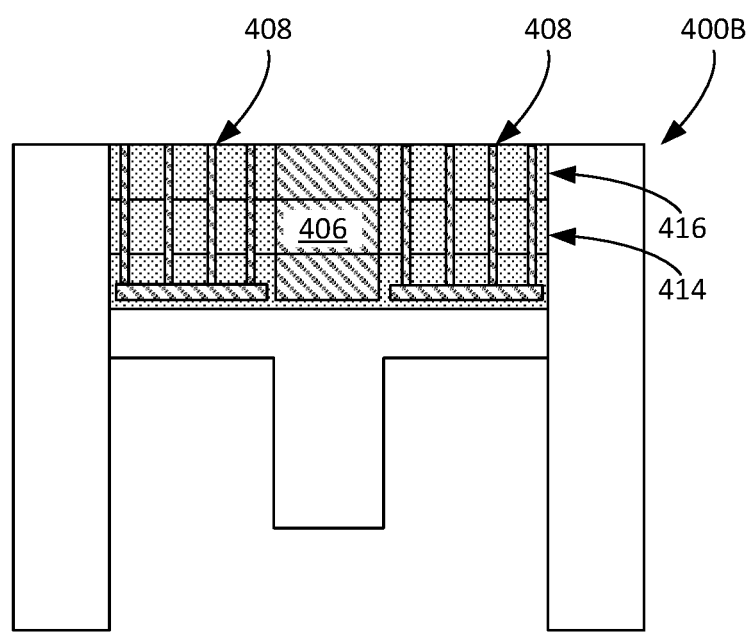

At operation 400B depicted in FIG. 4B, the controller continues controlling the dispensing system to dispense additional groups of layers 414, 416. While the groups of layers 414, 416 are being dispensed, the controller controls the energy source to selectively fuse portions of the layers to form the workpiece 406 as well as the brace structure 408.

Optionally, the controller determines whether additional levels (e.g., similar to the horizontal level 410) of the brace structure 408 are formed as the groups of layers 414, 416 are dispensed. The controller determines that additional levels of the brace structure 408 are fused based on, for example, the geometry of the workpiece 406. As shown in FIG. 4B, the brace structure 408 does not include horizontal levels within the groups of layers 414, 416. The controller may determine to not control the energy source to fuse horizontal levels within the groups of layers 414, 416 because the horizontal cross-sectional geometry of the workpiece 406 does not substantially change within these layers.

In some examples, the controller determines the geometry of the workpiece 406 using the CAD data and can compute geometric overlap between two or more portions of the object, particularly between two or more portions of the object that would be positioned in different groups of layers during the build process. If the geometric overlap between two portions is below a threshold overlap, the controller can generate instructions to control the dispensing system and the energy source so as to form horizontal levels of the brace structure in the layers containing the geometric transition between the two layers. The geometric overlap can correspond to a percent overlap between a parallel projection of one of the portions on the top surface of the build platform 404 and a parallel projection of the other portion on the top surface of the build platform 404. The threshold overlap can be, for example, a threshold percent overlap between 50% and 90%.

Figure 4C:
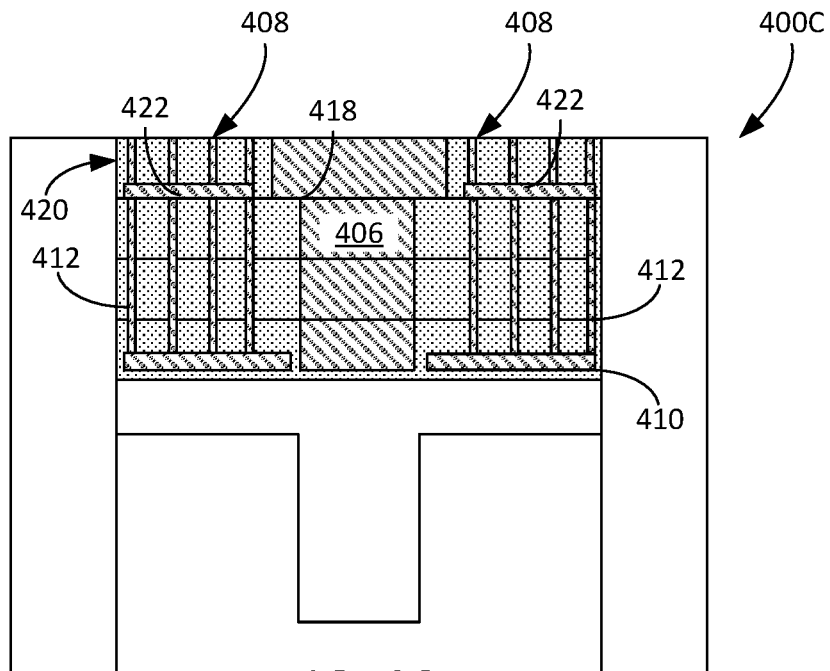

For example, as shown at operation 400C depicted in FIG. 4C, the workpiece 406 includes a stepped portion 418 in its geometry. Thus, within the groups of layers 420, the controller selects a brace region based on the geometry of the workpiece 406 within the group of layers 420. As shown in FIG. 4C, the horizontal cross-section of the workpiece 406 within the group of layers 420 has a greater width than the horizontal cross-section of the workpiece 406 within the groups of layers 402, 414, 416. In this regard, the brace structure 408, particularly an inner perimeter brace of a horizontal level 422 formed within the group of layers 420 has a correspondingly greater width as compared to the width of the inner perimeter brace of the horizontal level 410.

While described as a stepped portion 418, other types of geometries of the workpiece 406 can serve as a basis for the controller to build a horizontal level in a particular group of layers. For example, the controller can build a horizontal level within a gradual geometric transition of the workpiece from one cross-sectional area to another cross-sectional area.

The vertically extending portions 412 of the brace structure 408, if present, connect the horizontal level 410 to the horizontal level 422 to inhibit relative movement between the horizontal level 410 and the horizontal level 422. In some cases, to support the vertically extending portions 412, the controller can operate the energy source to form horizontal levels within groups of layers even though the geometry of the workpiece 406 does not change substantially within those groups of layer. For example, horizontal levels along the length of the vertically extending portions 412 can inhibit buckling along the length of the vertically extending portions 412.

Figure 4D:
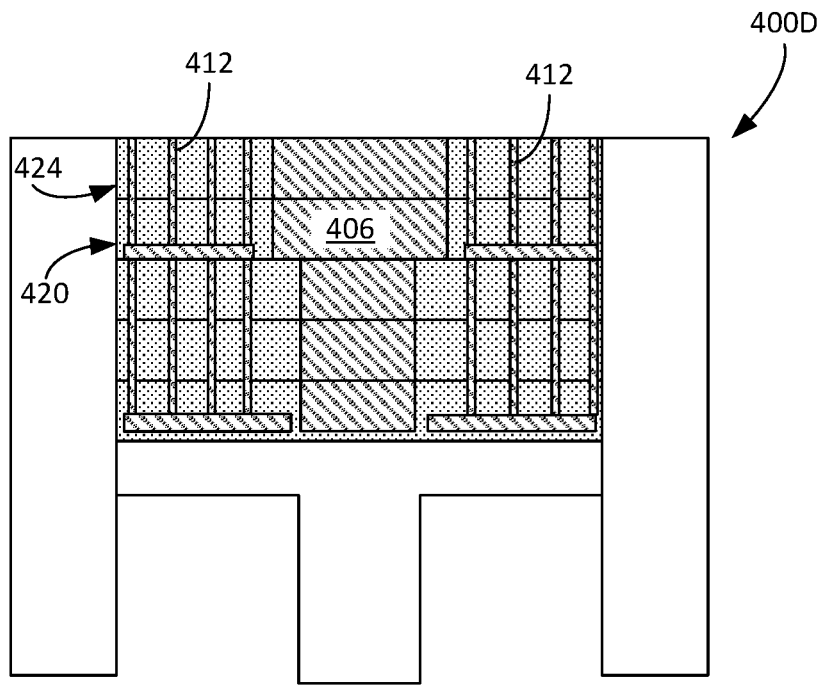

At operation 400D depicted in FIG. 4D, an additional group of layers 424 is dispensed above the underlying groups of layers. As the geometry of the horizontal cross-section of the workpiece 406 in the group of layers 424 does not substantially change relative to the geometry of the horizontal cross-section of the workpiece in the group of layers 420, the controller controls the energy source to continue forming the vertically extending portions 412 but does not control the energy source to fuse horizontal levels within the group of layers 424.

Figure 4E:
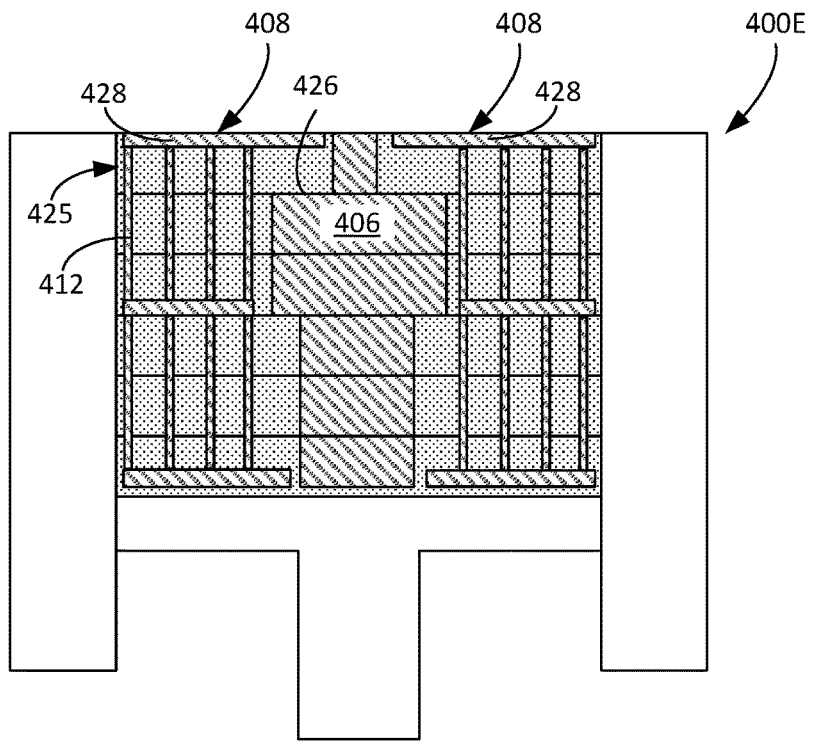

At operation 400E as depicted in FIG. 4E, the workpiece 406 includes another stepped portion 426. The controller operates the dispensing system to continue dispensing yet another group of layers 425. The controller, meanwhile, also operates the energy source to continue forming the vertically extending portions 412 and, because of the stepped portion 426, to form yet another horizontal level 428 to support the workpiece 406. The brace structure 408 within the horizontal level 428 has a geometry that matches the geometry of the workpiece 406 within the group of layers 425.

Figure 4F:
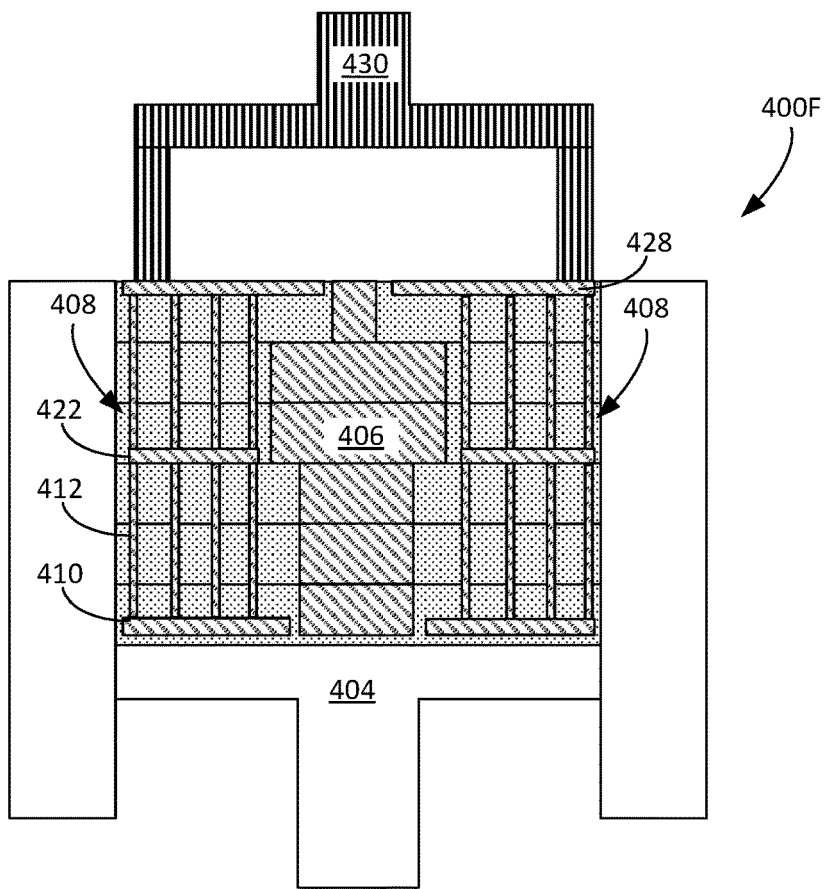

At operation 400F depicted in FIG. 4F, the controller has completed the process of dispensing and fusing the powder to form the object, e.g., the workpiece 406. The controller operates a robot arm 430, if present, to remove the brace structure 408 from the workpiece 406. After removing the brace structure 408 from the workpiece 406, the robot arm 430 can remove the workpiece 406 from the build platform 404. In some examples, a human operator performs one or more of the operations of removing the brace structure 408 from the workpiece 406, removing the brace structure 408 from the build platform 404, and removing the workpiece 406 from the build platform 404.

In some examples, the robot arm 430 removes the workpiece 406 with the brace structure 408 from the build platform 404. The brace structure 408 can be formed in such a manner that each of the horizontal levels 410, 422, 428 can be moved along a longitudinal axis of the workpiece 406 (e.g., a vertical axis as shown in FIGS. 4A to 4F) and be removed from an upper and/or lower end of the workpiece 406. The horizontal levels 410, 422, 428 thus each has an inner perimeter brace that enables the horizontal levels 410, 422, 428 to be removed from the workpiece 406 in this manner. In one example, the controller determines the offset distance for each of the inner perimeter braces for the horizontal levels 410, 422, 428 based on the perimeter of the object region of the workpiece 406 in the group of layers corresponding to the position of the horizontal levels 410, 422, 428.

The controller selects the offset distance such that the perimeter of the object perimeter region forming the inner perimeter braces, as projected on the top surface of build platform, contains at least one of (i) the perimeter of the object region of each of the layers of the workpiece 406 below the horizontal levels 410, 422, 428, as also projected on the top surface of the build platform 404 and (ii) the perimeter of the object region of the workpiece 406 of each of the layers above the horizontal levels 410, 422, 428, as projected on the top surface of the build platform 404. If the perimeter of the inner perimeter brace for a horizontal level contains the projected perimeter of the object regions below the horizontal level, the horizontal level would be removable from the lower end of the workpiece 406. If the perimeter of the inner perimeter brace for the horizontal level contains the projected perimeter of the object regions above the horizontal level, the horizontal level would be removable from the upper end of the workpiece 406.

In some cases, some of the horizontal levels are removable from the upper end of the workpiece 406 while other horizontal levels are removable from the lower end of the workpiece 406. The horizontal levels removable from the upper end of the workpiece 406 can be connected to one another by a set of vertically extending portions, and the horizontal levels removable from the lower end of the workpiece 406 can be connected to one another by another set of vertically extending portions. The horizontal levels removable from the upper end are not connected to the horizontal levels removable from the lower end, e.g., they are not connected by vertically extending portions. With this configuration of the brace structure, the horizontal levels removable from the upper end with its corresponding set of vertically extending portions form a first brace structure, and the horizontal levels from the lower end with its corresponding set of vertically extending portions form a second brace structure. The first brace structure is removed by the robot arm 430 by moving the first brace structure in a first direction, e.g., an upward direction, relative to the workpiece 406. The second brace structure is removed by the robot arm 430 by moving the second brace structure in a second direction, e.g., a downward direction, relative to the workpiece 406.

The controller operates the robot arm 430 to manipulate the brace structure 408 while the brace structure 408 is contained within the build platform 104. In some examples, the controller operates the robot arm 430 to break the brace structure 408 while the brace structure 408 is contained within the build platform 104. The robot arm 430 breaks the brace structure 408 along the vertically extending portions 412 by, for example, twisting the brace structure 408. The torsion from the twisting can cause the vertically extending portions 412 to rupture, and the robot arm 430 can proceed to remove pieces of the brace structure 408 from the workpiece 406.

If the brace structure 408 includes keyed portions, e.g., the keyed portions 168, the robot arm 430 optionally includes an end effector having a corresponding lock portion that engages with the keyed portions 168. The lock portion has a geometry that matches the geometry of the keyed portions 168 such that the robot arm 430 can grasp the keyed portions 168. The robot arm 430 can include a lock portion for each of the keyed portions present on the brace structure 408. If the keyed portions 168 are present on the brace structure 408, the controller removes the brace structure 408 from the workpiece 406 by controlling the end effector of the robot arm 430 such that the lock portion engages with the keyed portion 168. In some examples, the controller causes the lock portion to engage the keyed portion 168 by rotating the robot arm 430 about a vertical axis. The rotation of the robot arm 430 thereby causes the lock portion to rotate into engagement with the keyed portion 168. The lock portion of the end effector engaged with the keyed portion 168 enables the robot arm 430 to be coupled to the brace structure 408 such that vertical displacement of the robot arm 430 results in vertical displacement of the brace structure 408.

Figure 5:
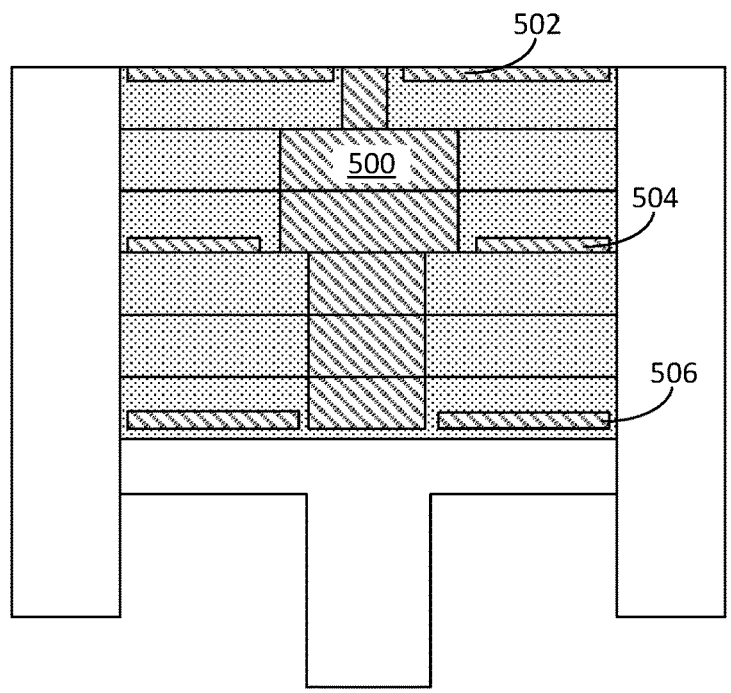
FIG. 5 is a side vertical cross-sectional view of an additive manufacturing apparatus having formed an example of an object and a brace structure.

While the operations 400A to 400F depicted in FIGS. 4A to 4F show a single brace structure 408 with each of the horizontal levels connected to one another by vertically extending portions 412, in some examples, a workpiece can be supported by multiple brace structures. As shown in FIG. 5, a workpiece 500 is supported by multiple separated brace structures 502, 504, 506. Each of the brace structures 502, 504, 506 includes only strands that would form horizontal levels as described herein. In this regard, the brace structures 502, 504, 506 do not include a vertically extending portions.

Figure 6:
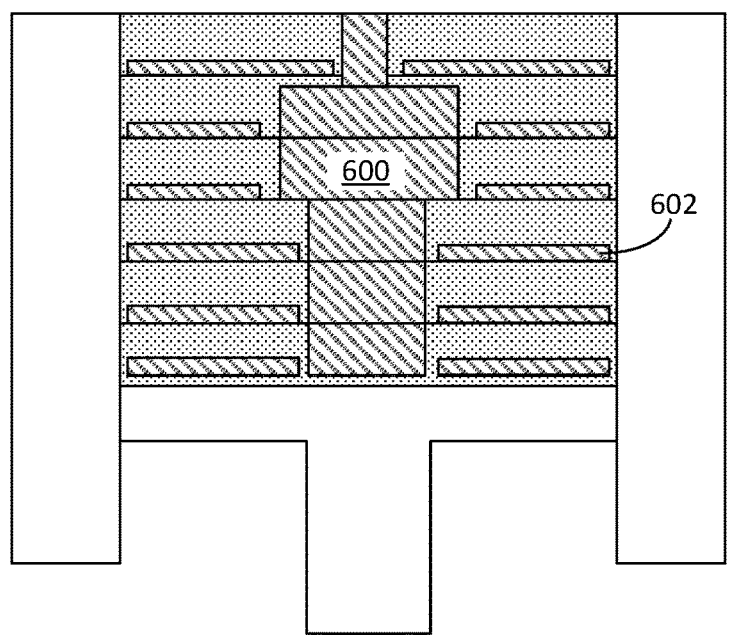

In some implementations, as shown in FIG. 6, a workpiece 600 is supported by brace structures 602 that are evenly spaced apart in a vertical direction. A brace structure 602 can be formed in each of the group of layers dispensed on the build platform.

Controllers and computing devices can implement these operations and other processes and operations described herein. As described above, the controller 138 of the apparatus 100 can include one or more processing devices connected to the various components of the apparatus 100, e.g., actuators, valves, and voltage sources, to generate control signals for those components. The controller can coordinate the operation and cause the apparatus 100 to carry out the various functional operations or sequence of steps described above. The controller can control the movement and operations of the systems of the printhead 102. The controller 138, for example, controls the location of feed material, including the first and second powder particles. The controller 138 also controls the intensity of the energy source based on the number of layers in a group of layers to be fused at once. The controller 138 also controls the location where energy is added by, for example, moving the energy source or the printhead.

The controller 138 and other computing devices part of systems described herein can be implemented in digital electronic circuitry, or in computer software, firmware, or hardware. For example, the controller can include a processor to execute a computer program as stored in a computer program product, e.g., in a non-transitory machine readable storage medium. Such a computer program (also known as a program, software, software application, or code) can be written in any form of programming language, including compiled or interpreted languages, and it can be deployed in any form, including as a standalone program or as a module, component, subroutine, or other unit suitable for use in a computing environment.

The controller 138 and other computing devices part of systems described can include non-transitory computer readable medium to store a data object, e.g., a computer aided design (CAD)-compatible file that identifies the pattern in which the feed material should be deposited for each layer. For example, the data object could be a STL-formatted file, a 3D Manufacturing Format (3MF) file, or an Additive Manufacturing File Format (AMF) file. For example, the controller could receive the data object from a remote computer. A processor in the controller 138, e.g., as controlled by firmware or software, can interpret the data object received from the computer to generate the set of signals necessary to control the components of the apparatus 100 to fuse the specified pattern for each layer.

While this document contains many specific implementation details, these should not be construed as limitations on the scope of any inventions or of what may be claimed, but rather as descriptions of features specific to particular embodiments of particular inventions. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The printhead of FIG. 1A includes several systems that enable the apparatus 100 to build objects. In some cases, instead of a printhead, an AM apparatus includes independently operated systems, including independently operated energy sources, dispensers, and sensors. Each of these systems can be independently moved and may or may not be part of a modular printhead. In some examples, the printhead includes only the dispensers, and the apparatus include separate energy sources to perform the fusing operations. The printhead in these examples would therefore cooperate with the controller to perform the dispensing operations.

While the operations are described to include a single size of powder particles, in some implementations, these operations can be implemented with multiple different sizes of powder particles. While some implementations of the AM apparatus described herein include two types of particles (e.g., the first and the second powder particles), in some cases, additional types of particles can be used. As described above, the first powder particles have a smaller size than the second powder particles. In some implementations, prior to dispensing the second powder particles to form a layer, the apparatus dispenses third powder particles onto the platen or underlying previously dispensed layer. This third powder particles can provide a thin layer onto which the first powder particles are dispensed. The third powder particles having a mean diameter that is at least two times smaller than the first mean diameter. This permits the second powder particles to settle into the layer of third particle particles. This technique can increase the density of the object at the bottom of the layer of second powder particles, e.g., if the first powder particles cannot infiltrate to the bottom of the layer of second powder particles.

The processing conditions for additive manufacturing of metals and ceramics are significantly different than those for plastics. For example, in general, metals and ceramics require significantly higher processing temperatures. Thus 3D printing techniques for plastic may not be applicable to metal or ceramic processing and equipment may not be equivalent. However, some techniques described here could be applicable to polymer powders, e.g. nylon, ABS, polyetheretherketone (PEEK), polyetherketoneketone (PEKK) and polystyrene.

A number of implementations have been described. Nevertheless, it will be understood that various modifications may be made. For example,

- Multiple disconnected brace structures can be formed. Each of the brace structure includes horizontal levels, vertically extending portions, or combinations thereof
- The horizontal levels can have strands of varying thickness. The strands closer to the workpiece can have greater thickness to provide greater support for the workpiece, thus decreasing the relative movement between the workpiece and the horizontal levels. In some cases, the vertically extending portions have strands of varying thickness.
- Vertically extending portions of the brace structure can include diagonal strands that extend both vertically and horizontally. The combination of the diagonal strands, the vertical strands, and the horizontal strands can form a truss-like structure that supports the workpiece. The patterns described herein, including the checkerboard pattern and the radial web pattern, can extend both horizontally and vertically.
- The controller can determine the thickness of the strands based on the structural configuration of the brace structure. For example, for a brace structure with a greater density of strands, the brace structure can include thinner strands and rely on structural configuration to provide the support for the workpiece. In contrast, for a brace structure with a smaller density of strands, the strands may be thicker to provide the support for the workpiece.
- The resolution for the brace structure can be less than the resolution of the workpiece to decrease the duration of time or the expenditure of energy used to form the brace structure.
- If the apparatus dispenses two or more types of powder, the brace structure can be formed from one type of powder, e.g., the larger powder, and the workpiece can be formed from another type of powder, e.g., the smaller powder.
- In addition to or as an alternative to being removable from an upper end and a lower end of the workpiece, the brace structure can be removable from a side of the workpiece. The vertically extending strands can be formed such that the workpiece is able to pass through openings formed between the vertically extending strands.
- The vertically extending strands can form patterns while the horizontally extending strands can connect the vertically extending strands. For example, a set of vertically extending strands can form a radial web pattern or a checkerboard pattern similar to a horizontal level described herein. Another set can also form a radial web pattern or a checkerboard pattern. The horizontally extending strands can connect the two sets of vertically extending strands.

Accordingly, other implementations are within the scope of the claims.

What is claimed is:

1. A method for forming an object, the method comprising:
    dispensing a plurality of successive layers of powder over a top surface of a platform;
    fusing an object region in each of the plurality of successive layers to form the object; and
    fusing a brace region in a particular layer from the plurality of layers to form a brace structure to inhibit lateral motion of the powder, wherein the brace region is spaced apart from the particular object region by a gap of unfused powder, and wherein the brace structure of the particular layer comprises a plurality of strands extending toward an outer perimeter of the particular layer.

2. The method of claim 1, wherein the brace region of the particular layer extends from sufficiently near the particular object region to inhibit relative motion between the object and the unfused powder.

3. The method of claim 1, wherein forming the plurality of strands comprises fusing a mesh region of the particular layer, the mesh region defining a plurality of separated cells of unfused powder in the particular layer.

4. The method of claim 3, wherein the plurality of separated cells form a checkerboard pattern, a radial web pattern or a rectangular pattern.

5. The method of claim 1, wherein:
    the particular layer is a first particular layer of the plurality of successive layers, and
    the method further comprises fusing a brace region in a second particular layer of the plurality of successive layers, the brace region of the second particular layer separated from a particular object region of the second particular layer by a gap of unfused powder, and the brace region of the second particular layer extends toward an outer perimeter of the of the second particular layer.

6. A method for forming an object, the method comprising:
    dispensing a plurality of successive layers of powder over a top surface of a platform, the plurality of successive layers of powder comprising a first layer and a second layer;
    fusing an object region in each of the plurality of successive layers to form the object; and
    fusing a first brace region for the first layer to form a first brace structure, wherein the first brace region is spaced apart from a particular object region by a gap of unfused powder, and wherein the brace region of the first layer surrounds a first object region of the first layer.

7. The method of claim 6, further comprising fusing a second brace region for the second layer to form a second brace structure, wherein the second brace region of the second layer surrounds a second object region of the second layer and is spaced apart from the second object region by a second gap of unfused powder.

8. The method of claim 7, wherein fusing the second brace region comprises fusing the second brace region in the second layer such that the brace structure comprises a vertical brace member extending vertically through the second layer, the vertical brace member connecting the second brace structure to the first brace structure.

9. The method of claim 8, further comprising fusing a brace region in each of the plurality of successive layers to form a brace structure in each of the plurality of successive layers, wherein fusing the brace region in each of the plurality of successive layers comprises fusing the first brace region and fusing the second brace region.

10. The method of claim 7, further comprising, before fusing the first brace region and the second region:
computing a geometric overlap between a first portion of the object corresponding to the first object region and a second portion of the object corresponding to the second object region, and
determining the geometric overlap is less than a threshold overlap.

11. A method for forming an object, the method comprising:
dispensing a plurality of successive layers of powder over a top surface of a platform, the plurality of successive layers of powder comprising a first layer and a second layer;
fusing an object region in each of the plurality of successive layers to form the object; and
fusing a first brace region for the first layer to form a first brace structure, wherein the brace region is spaced apart from a particular object region by a gap of unfused powder, and wherein the brace structure includes a brace member and a keyed portion along the brace member, the keyed portion having a thickness greater than a thickness of the brace member.

12. The method of claim 11, wherein the first layer is an uppermost layer of the plurality of successive layers.

13. The method of claim 11, further comprising after fusing the object region and fusing the brace region,
removing the brace structure and the object from the platform, and
removing the brace structure from the object by controlling an end effector having a lock portion engageable with the keyed portion.

14. The method of claim 11, wherein removing the brace structure from the object comprises sliding the brace structure relative to the object.

* * * * *

UNITED STATES PATENT AND TRADEMARK OFFICE
CERTIFICATE OF CORRECTION

| | |
|---|---|
| PATENT NO. | : 10,625,338 B2 |
| APPLICATION NO. | : 15/211960 |
| DATED | : April 21, 2020 |
| INVENTOR(S) | : Hou T. Ng et al. |

Page 1 of 1

It is certified that error appears in the above-identified patent and that said Letters Patent is hereby corrected as shown below:

In the Claims

Column 22, Line 36, Claim 5, delete "of the of the" and insert --of the-- therefor.

Signed and Sealed this
Seventh Day of July, 2020

Andrei Iancu
*Director of the United States Patent and Trademark Office*